United States Patent
White, Jr.

(10) Patent No.: US 6,231,073 B1
(45) Date of Patent: May 15, 2001

(54) INFLATABLE SIDE CURTAIN

(75) Inventor: Michael J. White, Jr., Almont, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/466,464

(22) Filed: Dec. 17, 1999

(51) Int. Cl.$^7$ .................................................. B60R 21/22
(52) U.S. Cl. ..................................... 280/730.2; 280/743.1
(58) Field of Search ........................... 280/743.1, 743.2, 280/730.1, 730.2

(56) References Cited

U.S. PATENT DOCUMENTS

| | | | |
|---|---|---|---|
| 5,280,954 | * 1/1994 | Henseler et al. | 280/743.1 |
| 5,788,270 | 8/1998 | Haland et al. | |
| 5,865,462 | 2/1999 | Robins et al. | |
| 5,884,937 | 3/1999 | Yamada | |
| 5,899,491 | 5/1999 | Tschaeschke | |
| 6,032,977 | * 3/2000 | Reh et al. | 280/743.1 |

FOREIGN PATENT DOCUMENTS

| | | |
|---|---|---|
| 19743626 | 4/1998 | (DE) . |
| WO9626087 | 2/1998 | (WO) . |
| WO9807598 | 2/1998 | (WO) . |

* cited by examiner

*Primary Examiner*—Eric Culbreth
(74) *Attorney, Agent, or Firm*—Tarolli, Sundheim, Covell, Tummino & Szabo L.L.P.

(57) ABSTRACT

Apparatus (10) for helping to protect an occupant of a vehicle (12) that has a side structure (16) and a roof (18) comprises an inflatable vehicle occupant protection device (14). The inflatable vehicle occupant protection device (14) is inflatable away from the vehicle roof (18) into a position between the side structure (16) of the vehicle (12) and a vehicle occupant. An inflation fluid source (24) provides inflation fluid for inflating the inflatable vehicle occupant protection device (14). The inflatable vehicle occupant protection device (14) comprises overlying panels (40 and 42) connected together along a perimeter (48) of the panels to define an inflatable volume and a connection (60) that interconnects the overlying panels within the perimeter. The connection (60) comprises a plurality of linear segments (62a, 62b, 62c) that extend in a generally horizontal direction and are spaced vertically apart. The linear segments (62a, 62b, 62c) are positioned relative to each other such that the second terminal end (66) of one of the linear segments (62a, 62b, 62c) lies on a vertically extending line (67) that intersects the first terminal end (64) of another of the linear segments.

17 Claims, 2 Drawing Sheets

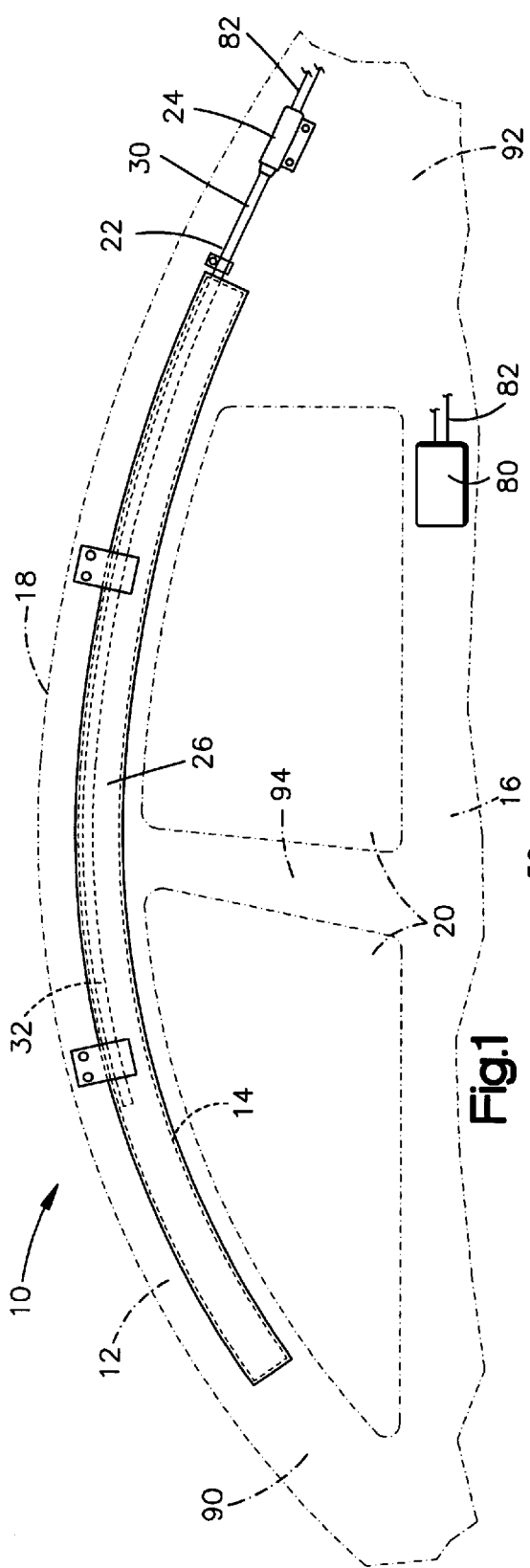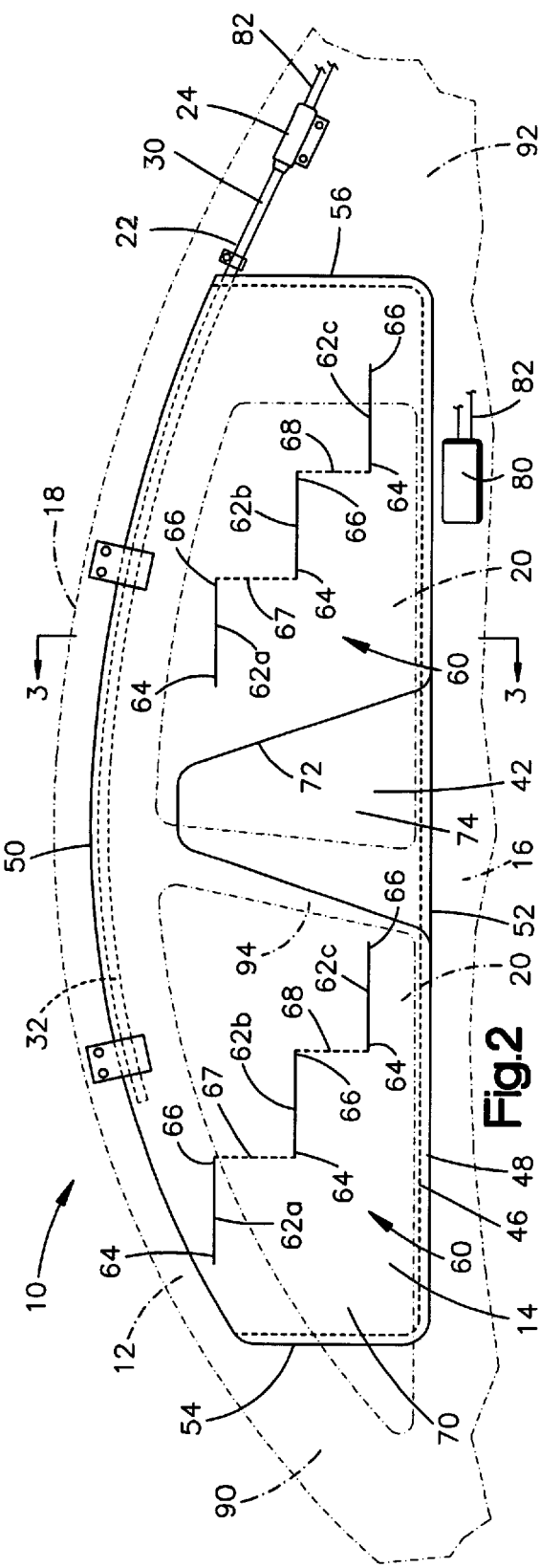

INFLATABLE SIDE CURTAIN

FIELD OF THE INVENTION

The present invention relates to an inflatable apparatus for helping to protect a vehicle occupant in the event of a side impact to a vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates from the roof of the vehicles downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the inflatable vehicle occupant protection device. The inflatable vehicle occupant protection device comprises overlying panels connected together along a perimeter of the panels to define an inflatable volume and a connection that interconnects the overlying panels within the perimeter. The connection comprises a plurality of linear segment that extend in a generally horizontal direction and are spaced vertically apart. The linear segments are positioned relative to each other such that the second terminal end of one of the linear segments lies on a vertically extending line that intersects the first terminal end of another of the linear segments.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable apparatus illustrating the apparatus in a deflated condition;

FIG. 2 is a schematic view of the apparatus of FIG. 1 in an inflated condition.

DESCRIPTION OF PREFERRED EMBODIMENTS

Figure 3:
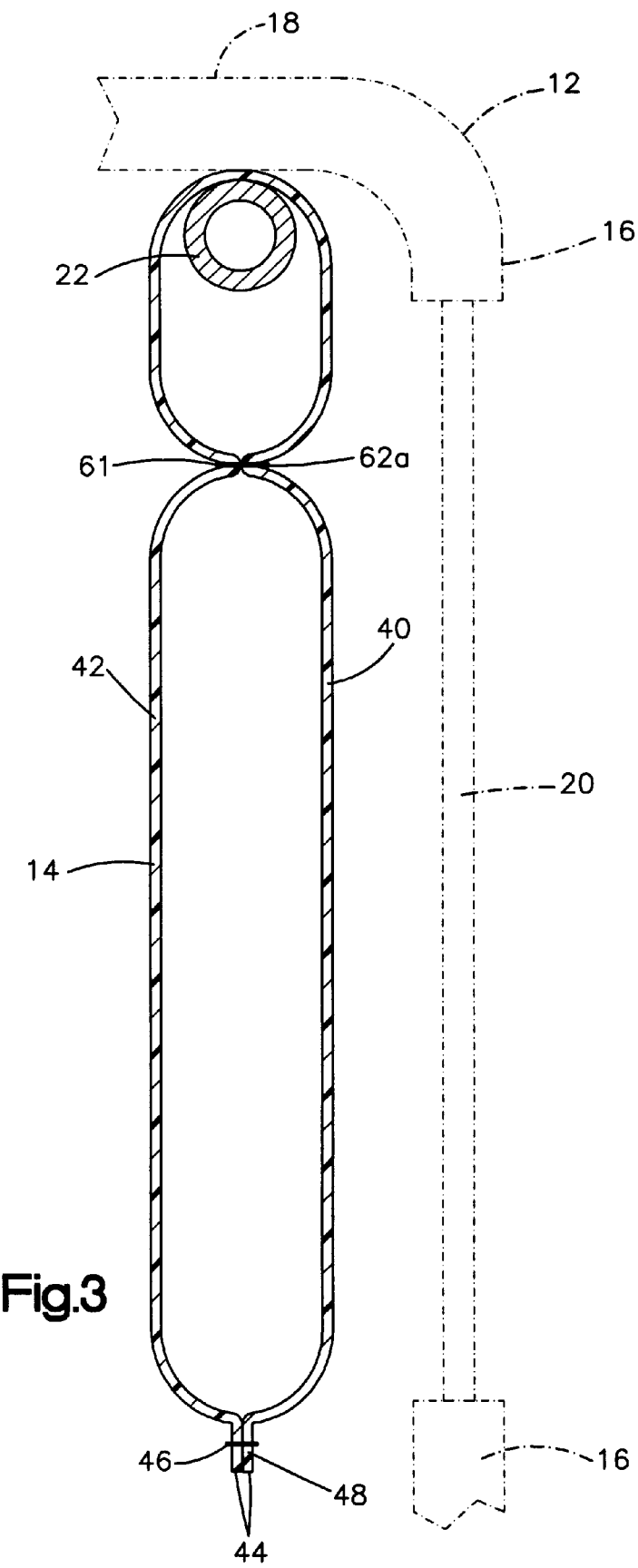
FIG. 3 is a sectional view of the apparatus taken generally along line 3—3 in FIG. 2.

As representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 22 could be of any suitable type or construction for supplying a medium for inflating the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

As best illustrated in FIG. 3, the inflatable curtain 14 comprises first and second panels 40 and 42 that are arranged in an overlying manner. Overlapping portions 44 of the first and second panels 40 and 42 are secured together by stitching 46 (FIGS. 2 and 3) that extends along a portion of the perimeter 48 of the inflatable curtain 14.

In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire perimeter 48 of the panels to form the inflatable curtain 14. The first and second panels 40 and 42 may also be woven together and have interwoven portions that interconnect the panels to form the inflatable curtain 14.

The first and second panels 40 and 42 are constructed of a fabric, such as nylon, that is coated with a gas impermeable material, such as urethane or silicone, to form an inflatable volume. The inflatable curtain 14 thus has a substantially air-tight construction. Other materials, such as elastomers, plastic films, or combinations thereof, may also be used to construct the inflatable curtain 14. The first and second panels 40 and 42 may also be formed of single or multi-layered sheets of material.

The perimeter 48 (FIG. 2) of the inflatable curtain 14 is defined by upper and lower edges 50 and 52, respectively, of the curtain and horizontally spaced front and rear edges 54 and 56, respectively, of the curtain. The front and rear edges 54 and 56 of the inflatable curtain 14 extend from the upper edge 50 to the lower edge 52 of the curtain. Although the front and rear edges 54 and 56 of the inflatable curtain 14 are illustrated as being generally vertical, the front and/or rear edge of the curtain could be formed by extending the upper and lower edges 50 and 52 until they intersect.

The inflatable curtain 14 includes connections 60 (FIGS. 2 and 3) located within the perimeter 48 of the curtain. The connections 60 interconnect the first and second panels 40 and 42. In the illustrated embodiment, there are two such connections 60. The connections 60 comprise seams that are formed by known means, such as stitching or weaving. Alternative means such as dielectric sealing, ultrasonic bonding, heat sealing, and adhesives may also be used to form the connections 60. The connections 60 may also comprise tethers that correspond to the shape of the step-shaped connections and are sewn or otherwise secured to the panels 40 and 42 to interconnect the panels.

Each connection 60 includes three linear segments 62a, 62b, 62c, that interconnect the panels 40 and 42. The linear segment 62a, 62b, 62c extend generally horizontally and parallel to each other when the inflatable curtain 14 is in the inflated condition of FIG. 2. The linear segments 62a, 62b, 62c are preferably equal in length, and are spaced apart vertically.

Each linear segment 62a, 62b, 62c has first and second opposite terminal ends 64 and 66, respectively. The linear segment 62a is positioned above linear segment 62b. The linear segment 62a is located such that the second terminal end 66 of linear segment 62a is positioned immediately above the first terminal and 64 of linear segment 62b. The second terminal end 66 of the linear segment 62a lies on a vertically extending line 67 that intersects the first terminal end 64 of linear segment 62b.

The linear segment 62b is positioned above linear segment 62c. The linear segment 62b is located such that the second terminal end 66 of linear segment 62b is positioned immediately above the first terminal end 64 of linear segment 62c. The second terminal end 66 of the linear segment 62b lies on a vertically extending line 68 that intersects the first terminal end 64 of linear segment 62c. The linear segments 62a, 62b, and 62c, in combination with the vertically extending lines 67 and 68, are therefore arranged in a step-shaped manner.

The upper and lower edges 50 and 52 and the front and rear edges 54 and 56 of the inflatable curtain 14 define an inflatable chamber 70 that surrounds the connections 60. In the illustrated embodiment, the chamber 70 surrounds both of the connections 60. The inflatable curtain 14 may include a seam 72 that defines a non-inflatable portion 74 of the curtain. The seam 72 may also help to define the overall shape of the chamber 70.

The vehicle 12 includes a sensor mechanism 80 (shown schematically in FIGS. 1 and 2) for sensing a side impact to the vehicle 12 and/or a rollover of the vehicle 12. The sensor mechanism 80 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 80 provides an electrical signal over lead wires 82 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 is positioned adjacent to the intersection of the roof 18 and the side structure 16 of the vehicle 12. The front edge 54 is positioned adjacent to an A pillar 90 of the vehicle 12. The rear edge 56 of the inflatable curtain 14 is positioned adjacent to a C pillar 92 of the vehicle 12. The inflatable curtain 14 extends between the A pillar 90 and the C pillar 92 of the vehicle 12 and overlies at least a portion of the A pillar, the C pillar, and a B pillar 94 of the vehicle.

It will be recognized by those skilled in the art that the inflatable curtain 14 may have alternative configurations. For example, in the illustrated embodiment, the inflatable curtain 14 extends between the A pillar 90 and the C pillar 92 of the vehicle 12. The inflatable curtain 14 could, however, extend between the A pillar 90 and the B pillar 94 only or between the B pillar and the C pillar 92 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. When the curtain 14 is inflated, the inflatable chamber 70 is positioned along the side structure 16 of the vehicle 12. The connections 60 help to limit the thickness and volume of the inflated inflatable curtain 14. The chamber 70 helps to absorb the energy of impacts with the inflatable curtain 14 and helps to distribute the impact energy over a large area of the curtain.

From the above description of the invention, those skilled in the art will perceive improvements, changes and modifications. For example, the number of connections 60 could vary depending upon the length of the inflatable curtain 14 along the side structure 16 of the vehicle 12. For example, if the inflatable curtain extended between just the A pillar and B pillar of the vehicle, only one connection may be incorporated in the curtain, whereas if the curtain extended between the A pillar and the C pillar or D pillar, two or more connections may be incorporated in the curtain. Also, the quantity and length of the linear segments of the connections 60 may be increased or decreased. The lengths of the linear segments may be increased so that adjacent linear segments overlap one another along their axial extents. Similarly, the lengths of the linear segments may be decreased so that adjacent linear segments are spaced apart axially with the second terminal end 66 of at least one linear segment being spaced axially from the first terminal end 64 of the adjacent, underlying linear segment. Such improvements, changes and modifications within the skill of the art are intended to be covered by the appended claims.

Having described the invention, the following is claimed:

1. Apparatus for helping to protect a vehicle occupant, said apparatus comprising:

an inflatable vehicle occupant protection device adapted to inflate away from a roof of a vehicle into a position between a side structure of the vehicle and a vehicle occupant; and an inflation fluid source that provides inflation fluid for inflating said inflatable vehicle occupant protection device, said inflatable vehicle occupant protection device comprising overlying panels connected together along a perimeter of the panels to define an inflatable volume and a connection that interconnects said overlying panels within said perimeter, said connection comprising a plurality of linear segments extending in a generally horizontal direction and being vertically spaced apart when said inflatable vehicle occupant protection device is inflated, each of said linear segments having first and second opposite terminal ends, said linear segments being positioned relative to each other such that the second terminal end of one of said linear segments lies on a vertically extending line that intersects the first terminal end of another of said linear segments, and the first terminal end of said one linear segment is spaced apart horizontally from the second terminal end of said another linear segment when said inflatable vehicle occupant protection device is inflated.

2. Apparatus as defined in claim 1, wherein said inflatable vehicle occupant protection device comprises a plurality of said connections.

3. Apparatus as defined in claim 1, wherein said perimeter of said inflatable vehicle occupant protection device is defined by an upper edge and a lower edge of said inflatable vehicle occupant protection device and front and rear edges horizontally spaced apart and extending between said upper and lower edges of said inflatable vehicle occupant protection device.

4. Apparatus as defined in claim 1 wherein said connection comprises stitching that interconnects said overlying panels.

5. Apparatus as defined in claim 1, wherein said inflatable vehicle occupant protection device is an inflatable curtain having a stored position extending along the side structure adjacent to a roof of the vehicle, said inflatable curtain being inflated away from the vehicle roof into said position between the side structure of the vehicle and a vehicle occupant.

6. Apparatus as defined in claim 5, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

7. Apparatus as defined in claim 5, wherein said inflatable curtain when inflated extends along the side structure of the vehicle between an A pillar and a C pillar of the vehicle.

8. Apparatus as defined in claim 5, wherein said inflatable curtain, when inflated, overlies at least a portion of an A pillar, a B pillar and a C pillar of the vehicle.

9. Apparatus as defined in claim 1, wherein a portion of said inflatable vehicle occupant protection device is uninflated when said inflatable occupant protection device is inflated.

10. Apparatus as defined in claim 1, further comprising a sensor for sensing a vehicle condition for which deployment of said inflatable occupant protection device is desired, said sensor actuating said inflation fluid source to provide inflation fluid to inflate said inflatable vehicle occupant protection device.

11. Apparatus as defined in claim 1, wherein said inflation fluid source comprises an inflator which is actuatable to inflate said inflatable vehicle occupant protection device.

12. Apparatus as defined in claim 1, wherein said one linear segment, said another linear segment, and said vertically extending line are arranged in a step-like manner.

13. Apparatus as defined in claim 1, wherein the second terminal end of said one linear segment is positioned vertically above the first terminal end of said another linear segment.

14. Apparatus as defined in claim 12, wherein the first terminal end of said one linear segment lies on a vertically extending line that is free from intersecting any other of said linear segments spaced vertically below said one linear segment when said inflatable vehicle occupant protection device is inflated.

15. Apparatus as defined in claim 1, wherein said linear segments extend parallel to each other.

16. apparatus as defined in claim 1, wherein said linear segments are equal in length.

17. Apparatus for helping to protect a vehicle occupant, said apparatus comprising:

an inflatable vehicle occupant protection device adapted to inflate away from a roof of a vehicle into a position between a side structure of the vehicle and a vehicle occupant; and an inflation fluid source that provides inflation fluid for inflating said inflatable vehicle occupant protection device, said inflatable vehicle occupant protection device comprising overlying panels connected together along a perimeter of the panels to define an inflatable volume and a connection that interconnects said overlying panels within said perimeter, said connection comprising a plurality of linear segments extending in a generally horizontal direction and being vertically spaced apart when said inflatable vehicle occupant protection device is inflated, each of said linear segments having first and second opposite terminal ends, said linear segments being offset horizontally relative to each other such that a vertically extending line that intersects the first terminal end of any one of said linear segments is free from intersecting the first terminal end of another of said linear segments when said inflatable vehicle occupant protection device is inflated.

\* \* \* \* \*

UNITED STATES PATENT AND TRADEMARK OFFICE
CERTIFICATE OF CORRECTION

PATENT NO.    : 6,231,073 B1
DATED         : May 15, 2001
INVENTOR(S)   : Michael J. White, Jr.

It is certified that error appears in the above-identified patent and that said Letters Patent is hereby corrected as shown below:

Column 5,
Line 49, delete "occupant protection device" and insert -- curtain --.

Column 6,
Line 1, delete "occupant protection device" and insert -- curtain --.

Signed and Sealed this

Thirteenth Day of August, 2002

Attest:

JAMES E. ROGAN
Attesting Officer        Director of the United States Patent and Trademark Office